United States Patent
Engstrom et al.

(10) Patent No.: US 7,079,864 B2
(45) Date of Patent: *Jul. 18, 2006

(54) ADDING PERIPHERAL DEVICES TO MOBILE DEVICES VIA SMART INTERCHANGEABLE COVER

(75) Inventors: G. Eric Engstrom, Kirkland, WA (US); Peter Zatloukal, Duvall, WA (US)

(73) Assignee: Wildseed, Ltd., Seattle, WA (US)

( * ) Notice: Subject to any disclaimer, the term of this patent is extended or adjusted under 35 U.S.C. 154(b) by 16 days.

This patent is subject to a terminal disclaimer.

(21) Appl. No.: 10/301,432

(22) Filed: Nov. 20, 2002

(65) Prior Publication Data

US 2003/0073415 A1  Apr. 17, 2003

Related U.S. Application Data

(63) Continuation-in-part of application No. 10/087,098, filed on Mar. 1, 2002, now abandoned, and a continuation-in-part of application No. 09/932,154, filed on Aug. 17, 2001, now Pat. No. 6,721,545.

(60) Provisional application No. 60/419,001, filed on Oct. 15, 2002, provisional application No. 60/306,326, filed on Jul. 17, 2001, provisional application No. 60/292,123, filed on May 17, 2001.

(51) Int. Cl.
*H04B 1/38* (2006.01)
*H04M 1/00* (2006.01)

(52) U.S. Cl. ............... 455/557; 455/558; 455/556.1; 455/550.1; 455/552.1; 455/575.1; 455/90.3; 379/433.01; 379/433.11

(58) Field of Classification Search .. 455/575.1–575.6, 455/575.8, 90.1–90.3, 557–558, 556.1–2, 455/406–407, 410–411, 41.1–2, 550.1, 551, 455/552.1, 553.1, 344, 346–349; 379/433.01–433.13, 379/428.01, 434, 437, 440, 447; 235/462.45–49, 235/472.01–3; 705/41–42
See application file for complete search history.

(56) References Cited

U.S. PATENT DOCUMENTS 5,140,632 A    8/1992  Anten (Continued)

FOREIGN PATENT DOCUMENTS

DE    100 18 375 A1    10/2001

(Continued)

*Primary Examiner*—Quochien B. Vuong
*Assistant Examiner*—Tuan Tran
(74) *Attorney, Agent, or Firm*—Schwabe, Williamson & Wyatt, P.C.

(57) ABSTRACT

An interchangeable cover is endowed with one or more peripherals complementary electronics to add the one or more peripherals to a mobile device, to which the interchangeable cover is attached. In various embodiments, the peripherals may be a credit card reader, add on non-volatile storage, an ASIC, and so forth. In various embodiments, the complementary electronics are packaged in an ASIC with output pins similar to that of a SIM chip, which may include a properly equipped protocol processor for de-packaging and packaging data being inputted/outputted in accordance with selected protocols. In one embodiment, the cover is U-shaped. In a wireless mobile phone embodiment, the cover is attached to a rotatable sub-section of a pivotable section.

30 Claims, 10 Drawing Sheets

U.S. PATENT DOCUMENTS

| | | | |
|---|---|---|---|
| 5,260,998 A | 11/1993 | Takagi | |
| 5,436,954 A | 7/1995 | Nishiyama et al. | |
| 5,768,370 A * | 6/1998 | Maatta et al. | 379/433.01 |
| 5,794,164 A | 8/1998 | Beckert et al. | |
| 5,832,388 A | 11/1998 | Williams et al. | |
| 6,050,849 A | 4/2000 | Chang | |
| 6,070,795 A * | 6/2000 | Feiken | 235/380 |
| 6,171,138 B1 * | 1/2001 | Lefebvre et al. | 439/500 |
| 6,188,917 B1 * | 2/2001 | Laureanti | 455/573 |
| 6,234,389 B1 * | 5/2001 | Valliani et al. | 235/380 |
| 6,244,894 B1 * | 6/2001 | Miyashita | 439/500 |
| 6,549,789 B1 | 4/2003 | Kfoury | |
| 6,636,146 B1 * | 10/2003 | Wehoski | 340/10.4 |
| 6,771,981 B1 * | 8/2004 | Zalewski et al. | 455/557 |
| 6,898,283 B1 * | 5/2005 | Wycherley et al. | 379/433.11 |
| 6,978,123 B1 * | 12/2005 | Fuhrmann et al. | 455/90.3 |
| 2002/0025796 A1 * | 2/2002 | Taylor et al. | 455/406 |
| 2002/0030103 A1 * | 3/2002 | Wycherley et al. | 235/439 |
| 2003/0073462 A1 * | 4/2003 | Zatloukal et al. | 455/558 |
| 2005/0266894 A9 * | 12/2005 | Rankin | 455/572 |

FOREIGN PATENT DOCUMENTS

| | | |
|---|---|---|
| EP | 1 091 540 A2 | 4/2001 |
| EP | 1 217 808 A2 | 6/2002 |
| JP | 09307617 * | 11/1997 |
| WO | WO 01/37229 A1 | 5/2001 |
| WO | WO 02/11074 A2 | 2/2002 |
| WO | WO 03/017515 | 2/2003 |

* cited by examiner

ADDING PERIPHERAL DEVICES TO MOBILE DEVICES VIA SMART INTERCHANGEABLE COVER

RELATED APPLICATION

This application is a continuation-in-part application, claiming priority to (a) U.S. patent application Ser. No. 10/087,098, filed Mar. 1, 2002, now abandoned entitled "PERSONALIZING ELECTRONIC DEVICES AND SMART COVERING", which itself claims priority to its provisional filing No. 60/306,326, on Jul. 17, 2001;

(b) U.S. patent application Ser. No. 09/932,154, filed Aug. 17, 2001, now U.S. Pat. No. 6,721,545 entitled "MOBILE ELECTRONIC DEVICE AND COVERING FOR SIMILAR DEVICES WITH ORNAMENT ATTACHMENT MECHANISM", which itself claims priority to its provisional filing No. 60/292,123, on May 17, 2001; and (c) U.S. Provisional Application No. 60/419,001, filed Oct. 15, 2002, entitled "Adding Peripherals to Mobile Devices via Smart Interchangeable Covers".

FIELD OF THE INVENTION

The present invention relates to the field of mobile devices. More specifically, the present invention is related to adding peripherals to mobile devices, such as wireless mobile phones, personal digital assistants (PDA) and so forth, via smart interchangeable covers.

BACKGROUND OF THE INVENTION

Advances in microprocessor and telecommunication technology have led to wide spread deployment and adoption of mobile devices, such as wireless mobile phones and PDA. For wireless mobile phones, in addition to wireless telephony, the late models are often equipped with advanced capabilities, such as calendar, address book, games, access to the World Wide Web (WWW), emails, instant messaging, and so forth. Similarly, for PDA, in addition to calendar and address book functions, the late models are often equipped with advanced capabilities, such as wireless telephony, word processing, spreadsheets, and so forth. In other words, for advanced models, there are increasing cross over or convergent of the functionalities.

However, because of the compactness of the mobile device, typically only limited number of auxiliary and/or I/O peripherals (hereinafter, simply peripherals) are provided. For example, in the case of wireless mobile phones, typically only a 12-key keypad, a handful of control buttons, and limited amount of non-volatile storage are available, and in the case of PDA, only a handful of control buttons and limited amount of non-volatile storage are available. As a result, usability and in turn the user experience of these advanced functions are poor, which in turn leads to the reduced acceptance of the advanced functions, removal of economic incentives for further development and introduction of the advanced functions.

Some prior art mobile devices support the provision of addition peripherals, such as a keyboard, through attachment to an I/O port of the mobile device. However, as described earlier, because of the inherit compactness of mobile devices, only limited number of I/O ports, typically one, is available for attachment of external peripherals.

Thus, a need exists to provide additional peripherals to a mobile device in a more efficient manner.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF EMBODIMENTS OF THE INVENTION

The present invention includes an interchangeable cover equipped to add peripherals to a mobile device.

Parts of the description will be presented in terms, such as mobile devices, cover, peripherals, interface and so forth, consistent with the manner commonly employed by those skilled in the art to convey the substance of their work to others skilled in the art. As well understood by those skilled in the art, the terms "mobile devices" as used herein, including in the claims, comprise wireless mobile phones, PDA, and other devices of the like.

The term "cover" as used herein refers to a part that inherently include multiple surfaces that cover at least multiple ones of the exterior surfaces of the body or core unit of a mobile device, where the exterior surfaces are inherently disposed in different geometric planes. Accordingly, while a "cover" may come in many variants, as illustrated by the description to follow, a "card" like part, i.e. a part having the form factor of a "credit card", a PCMCIA card, a PC card, a Compact Flash card and so forth, is not a "cover", for the purpose of the present application. A "card" like part, for the purpose of the present application, by definition, is considered to occupy only one geometric plane.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. The phrase "in one embodiment" is used repeatedly. The phrase generally does not refer to the same embodiment, however, it may. The terms "comprising", "having" and "including" are synonymous, unless the context dictates otherwise.

Figure 1:
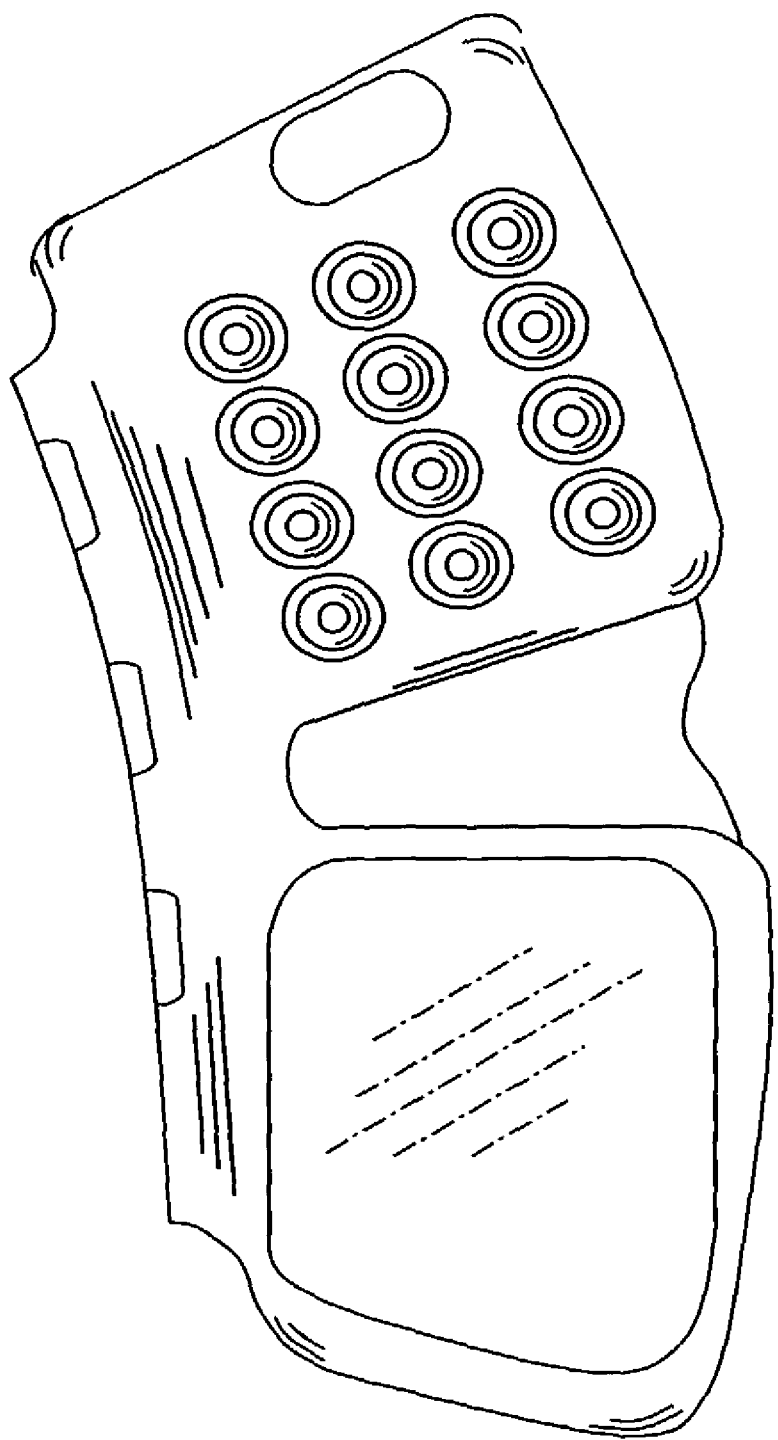
FIG. 1 illustrates a front view of an interchangeable cover incorporated with the teachings of the present invention, in accordance with one embodiment.
Figures 2A, 2B:
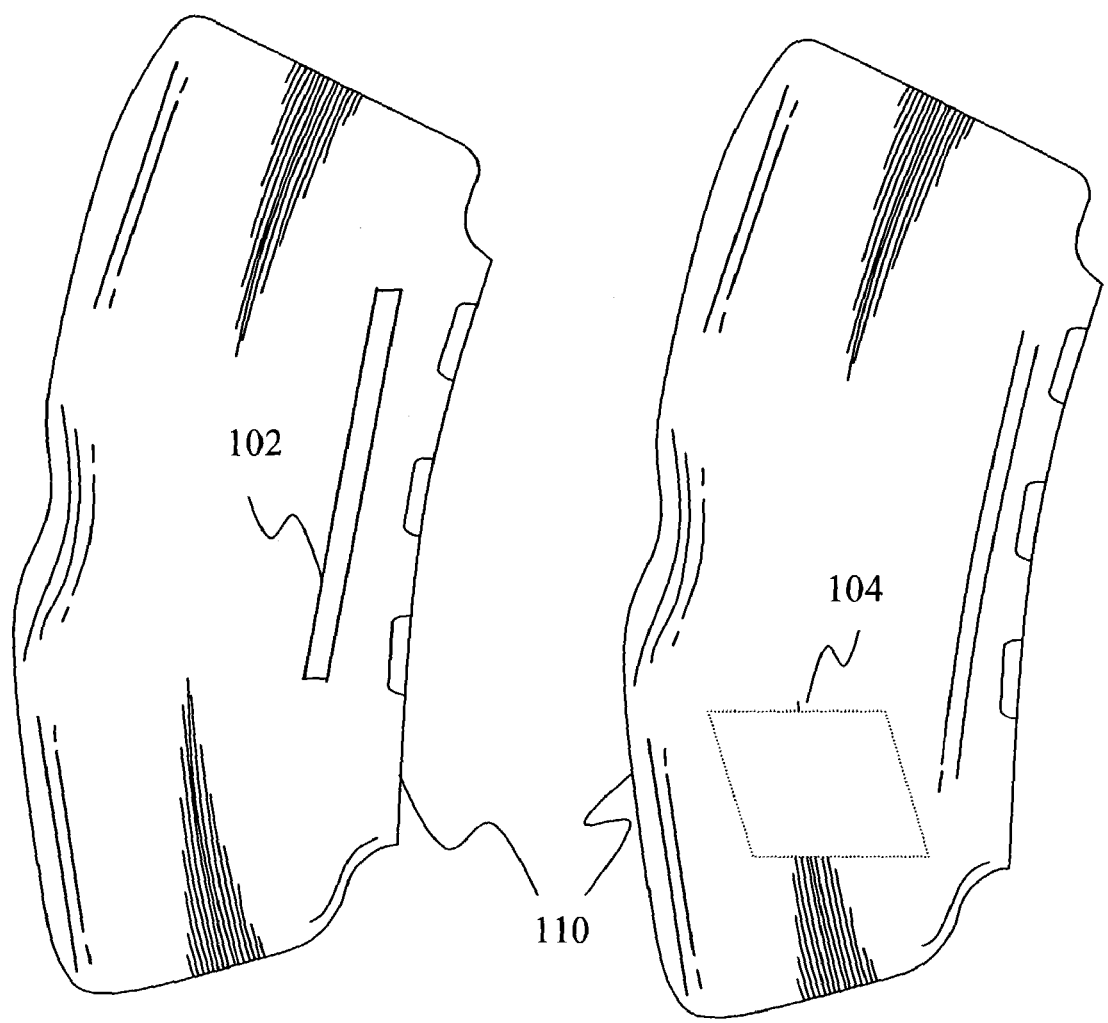
FIGS. 2a–2b illustrate a back view of an interchangeable cover incorporated with the teachings of the present invention, in accordance with two embodiments.

FIGS. 1 and 2a–2b illustrate an overview of the interchangeable cover of the present invention, in accordance with two embodiments. FIG. 1 illustrates a front view of the cover of both embodiments, which are identical for these two embodiments, whereas FIGS. 2a and 2b illustrate the back view of the cover of the two embodiments, which are different for these embodiments.

As illustrated, interchangeable cover 100 of the present invention is advantageously endowed with at least one peripheral 102 or 104 and complementary electronics (see FIGS. 3 and 5) to facilitate addition of peripherals 102–104 to a complementarily equipped mobile device, to which interchangeable cover 100 is attached.

For the illustrated embodiments, peripheral 102 represents a credit card reader, whereas peripheral 104 represents "add on" non-volatile storage, which may be EEPROM, Flash Memory, a compact disk drive and other devices of the like.

In alternate embodiments, peripherals 102–104 may be peripherals of other types, including but are not limited to ASICs having special function logic, such as compression/decompression, MPx player, optical scanner and so forth. In alternate embodiments, peripherals 102–104 may be disposed in other locations of cover body 110 of cover 100.

Still referring to FIG. 1, for the illustrated embodiment, cover body 110 of cover 100 has a substantially "rotated" U-shape or "taco shell" shape. Cover 100 is designed to attach to a core unit of a mobile device (such as the core unit of wireless mobile phone 300 of FIG. 4), in a side way manner (as denoted by arrow 310 of FIG. 4). For the embodiment, cover body 110 has multiple surfaces occupying different geometric planes, and covers at least partially each of a front, a side and a back exterior surface of the core unit of phone 300. For the embodiment, cover body 110 is designed to be snapped on to the core unit of a mobile device.

In alternate embodiments, cover body 110 may assume a body shape other than the illustrated "rotated" U-shape. Cover body 110 may also be designed to attach to a core unit of a mobile device in manner that is other than a side way manner. Similarly, cover body 110 may also be designed to attach to a core unit of a mobile device in a non-snapped on manner, even employing one or more fasteners. A number of these alternate embodiments are further described later.

Figure 3:
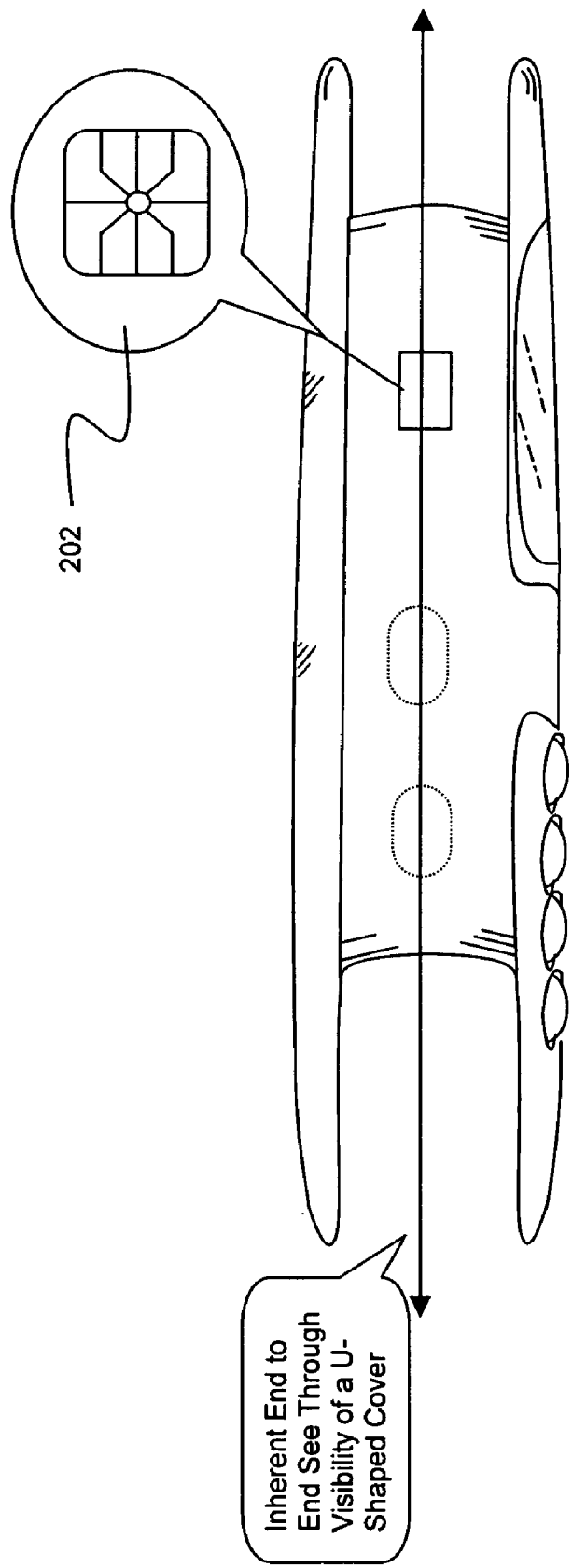
FIG. 3 illustrates another perspective view of the interchangeable cover.

As illustrated in FIG. 3, the complementary electronics of cover 100 are packaged as an application specific integrated circuit (ASIC) 202. For the illustrated embodiment, ASIC 202 has output "pins" that are similar to the output pins of embedded ASIC found in what's commonly referred to as "SIM chips". Further, ASIC 202 is disposed on the inside "side" surface of "rotated" U-shape body 110.

Peripherals 102–104 are coupled to ASIC 202 by way of traces disposed on the inside surfaces of "rotated" U-shape body 110. In various embodiments, a protective interior layer may be included with cover body 110 to protect the traces. The protective interior layer may be made of any one of a number of known suitable materials, such as plastics.

In alternate embodiments, ASIC 202 may employ output "pins" of other types. ASIC 202 may be disposed in other location or locations of cover body 110. Further, the complementary electronics may be "packaged" in other manners.

Figure 4:
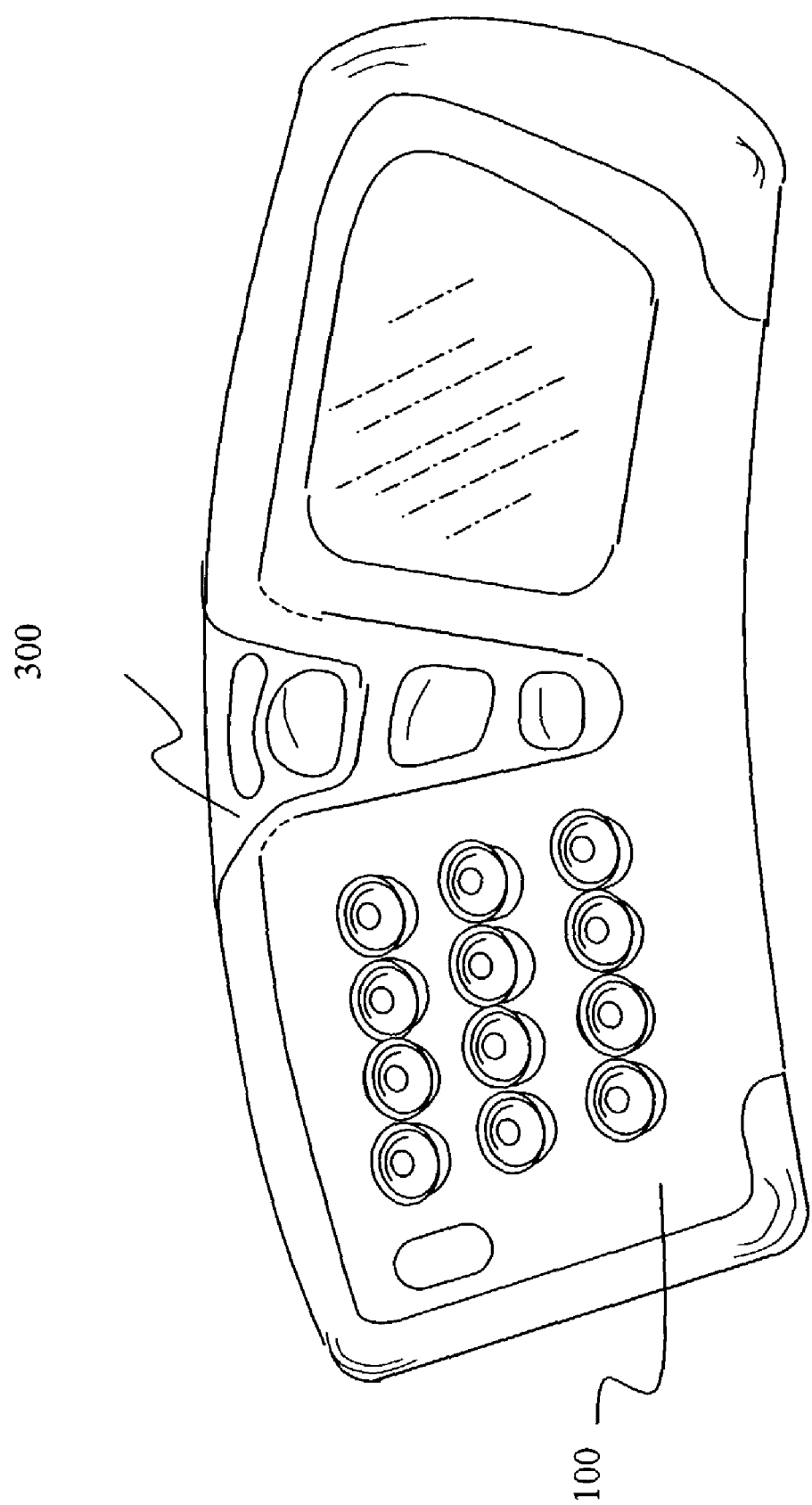
FIG. 4 illustrates a perspective view of the interchangeable cover having been removably mated with a core unit of a mobile device, in accordance with one embodiment.

FIG. 4 illustrates a perspective view of cover 100 of the present invention, attached to a core unit of a mobile device. For the illustrated embodiment, mobile device 300 is a wireless mobile phone. In particular, mobile device 300 includes an expansion I/O interface disposed at a "side" surface (covered by cover 100).

The expansion I/O interface comprises contacts that are complementary to the output "pins" of ASIC 202. Further, the expansion I/O interface is disposed at a location on an outer surface of the core unit of mobile device 300 corresponding to the disposition location of ASIC 202 on cover body 110.

From the descriptions to follow, it shall be readily apparent to one skilled in the art that the present invention may also be practiced with other types of interfaces, as well as with other mobile devices, in particular, personal digital assistants.

Figure 5:
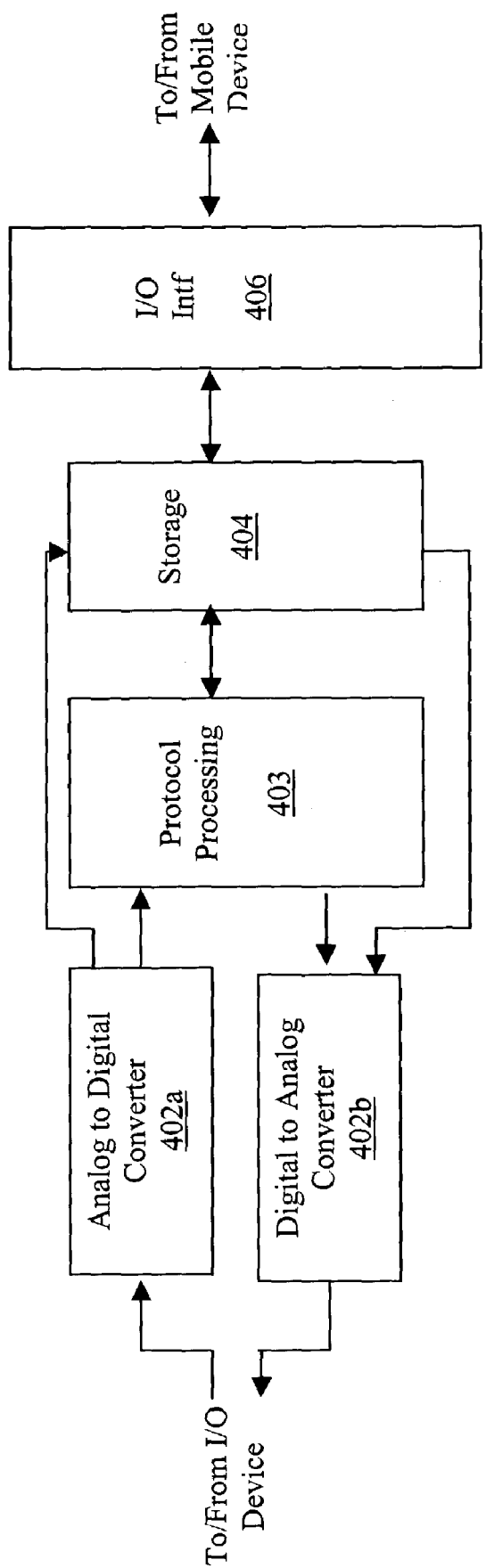
FIG. 5 illustrates an architectural view of the relevant electronic elements of the interchangeable cover of FIG. 1, in accordance with one embodiment.

FIG. 5 illustrates an architectural view of the relevant complementary electronics, in accordance with one embodiment. For the embodiment, the relevant complementary electronics 400 includes an analog-to-digital converter 402a, a digital-to-analog converter 402b, protocol processor 403, storage unit 404, and input/output (I/O) interface 406, coupled to each other as shown.

Analog-to-digital converter 402a is employed to digitize the analog signals received from peripherals 102–104. Similarly, digital-to-analog converter 402b is employed to convert digital signals into analog signals for output to peripherals 102–104 if necessary.

While the present invention is being described with add on peripherals that require A/D and D/A signal conversion, the present invention contemplates and includes the addition of peripherals that do not require such signal conversion. Modification of the described embodiments to arrive at such embodiments are well within the ability of those skilled in the art, accordingly will not be separately described.

Where applicable, protocol processor 403 is employed to recover the input data, and to package the output data for output in cases where data are inputted and outputted in accordance with a pre-defined protocol, e.g. a protocol in conformance to a particular credit card reader, a protocol in conformance to a particular non-volatile storage. Where applicable, for input data, protocol processor 403 performs the appropriate acknowledgement, processing of the header packet, extraction of data from the data packets, and so forth. Similarly, where applicable, for output data, protocol processor 403 performs the appropriate formation of data packets, formation of header packets, request for the serial bus and so forth.

Storage unit 404 is employed to store the digitized input data received from peripherals 102–104, and to store the digital data to be outputted to peripherals 102–104.

In various embodiments, storage unit 404 may be any one of a number of non-volatile memory known in the art, including but not limited to EEPROM, and so forth. In various embodiments, the storage locations of storage-unit 404 may be memory mapped into the memory space of mobile device 300.

I/O interface 406 facilitates an application or a system service of mobile device 300 in reading the inputs provided by peripherals 102–104, and to writing the outputs to be outputted to peripherals 102–104. As described earlier, I/O interface 406 may be any one of a number of I/O interfaces known in the art.

Figure 6:
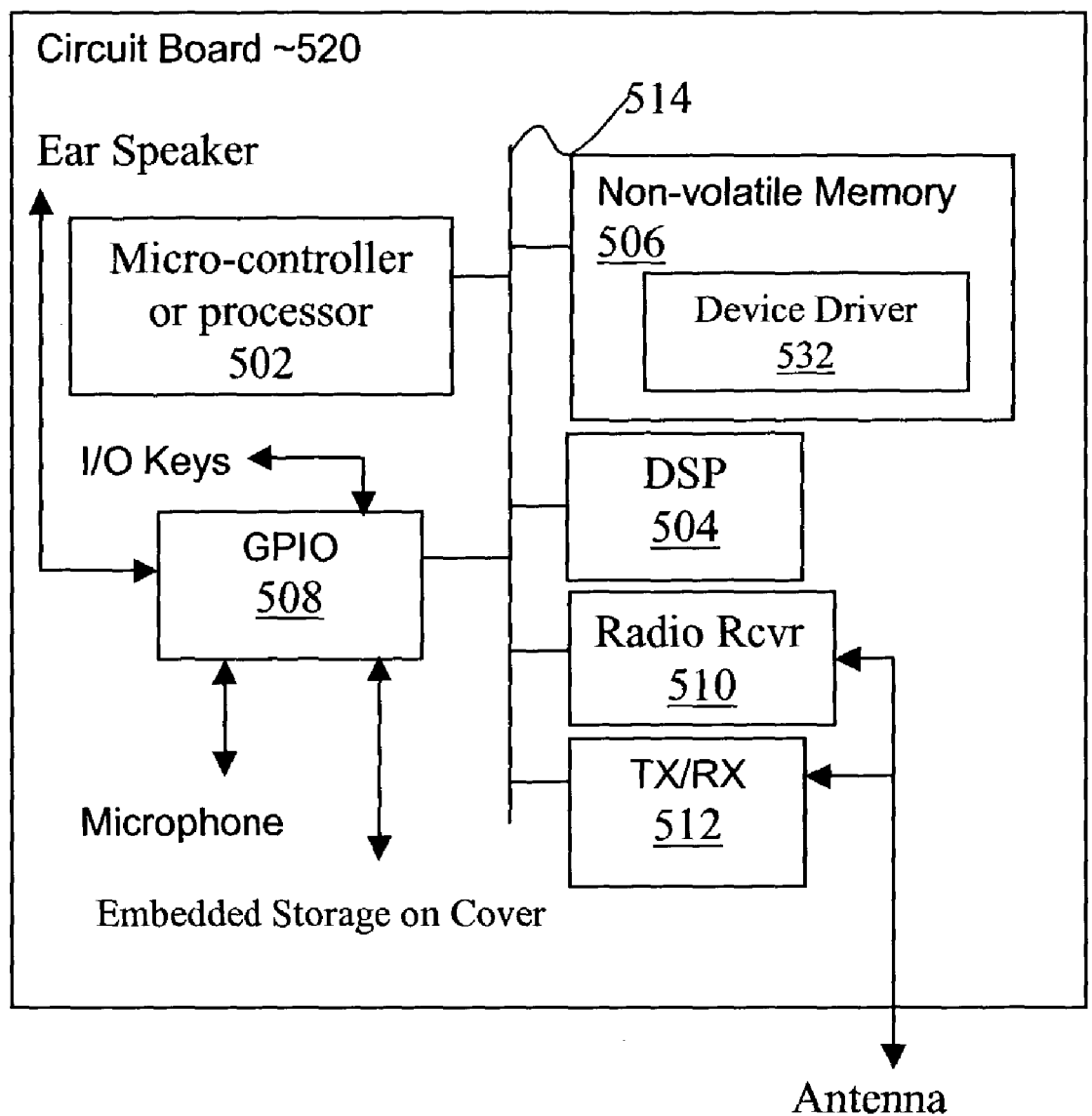
FIG. 6 illustrates an architectural view of the mobile device of FIG. 3, in accordance with one embodiment.

FIG. 6 illustrates mobile device 300 in further detail, in accordance with one embodiment. As alluded to earlier, for the illustrated embodiment, mobile device 300 is a wireless mobile phone; however, for other embodiments, mobile device 300 may be other mobile devices, including but are not limited to PDA.

As illustrated in FIG. 6, the core unit of wireless mobile phone 300 includes conventional elements, such as microcontroller/processor 502, digital signal processor (DSP) 504, non-volatile memory 506, general purpose input/output (GPIO) interface 508, radio receiver 510, and transmit/receive (TX/RX) 512 (also known as a transceiver), coupled to each other via bus 514, and disposed on a circuit board 520.

The core unit of wireless mobile phone 300 is endowed with a software implementation of a device driver 532 in support of the electronics packaged in ASIC 202.

Except for device driver 532 provided to mobile device 300, which relevant operating logic will be described more fully below, each of these elements 502–514 performs its conventional function known in the art, and is intended to represent a broad range of such element and its equivalents. In particular, GPIO 508 is configured to generate an interrupt notifying control processor 502 of data read from cover 100, which in turn directly or indirectly causes an application of mobile device 300 to be invoked and process the data read. Likewise, GPIO 508 is configured to write output data to be outputted to peripherals 102/104 onto storage unit 404, on request of control processor 502.

Further, TX/RX 512 may be designed to support one or more of any of the known signaling protocols, including but are not limited to CDMA, TDMA, GSM, and so forth. Moreover TX/RX 512 may be implemented using separate transmitter and receiver.

Accordingly, elements 502–514 will not be further described.

Figure 7A:
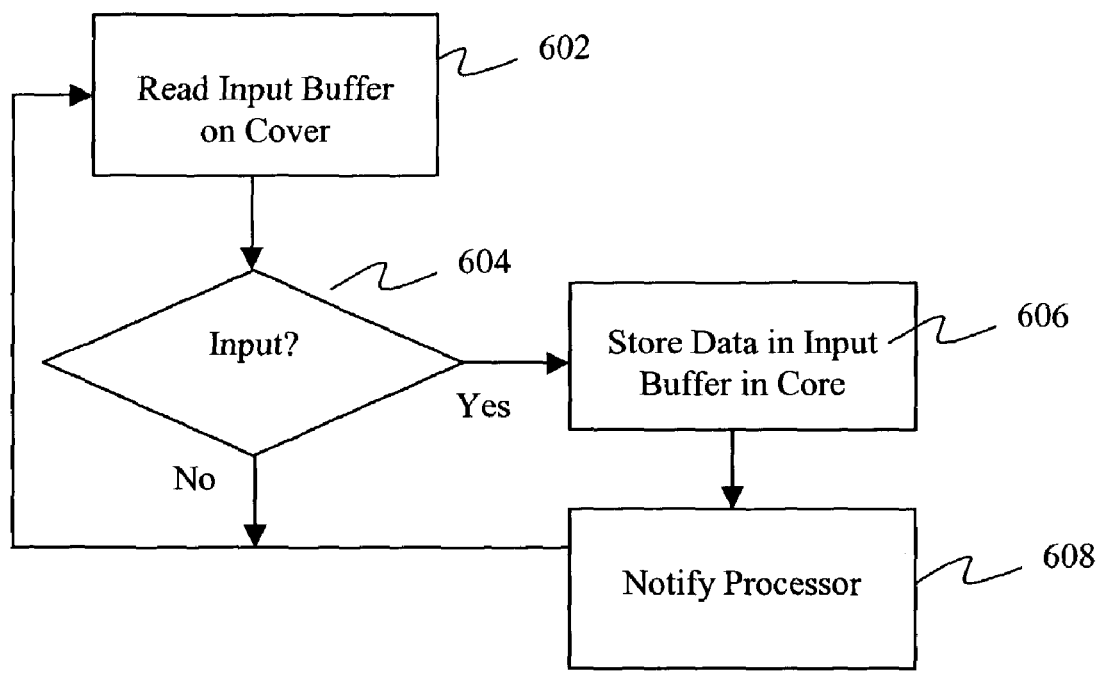
FIGS. 7a–7b illustrate the operational flow of the relevant aspects of the device driver of FIG. 6, in accordance with one embodiment.

As illustrated in FIG. 7a, upon invocation, device driver 532 of mobile device 300 attempts to read the memory mapped storage locations of cover 100 (hereinafter, simply input buffer on cover 100), block 602. At block 604, device driver 532 determines if data were present and read. If no data were present and read, the process continues back at block 602.

However, if data were read, device driver 532 stores the data read in storage locations of memory 506 of mobile device 300 (hereinafter, simply, input buffer in mobile device 300), block 606. As alluded to earlier, device driver 532 further notifies processor 502, causing an application to process the data read, block 608. Thereafter, the process continues back at block 602 again.

Figure 7B:
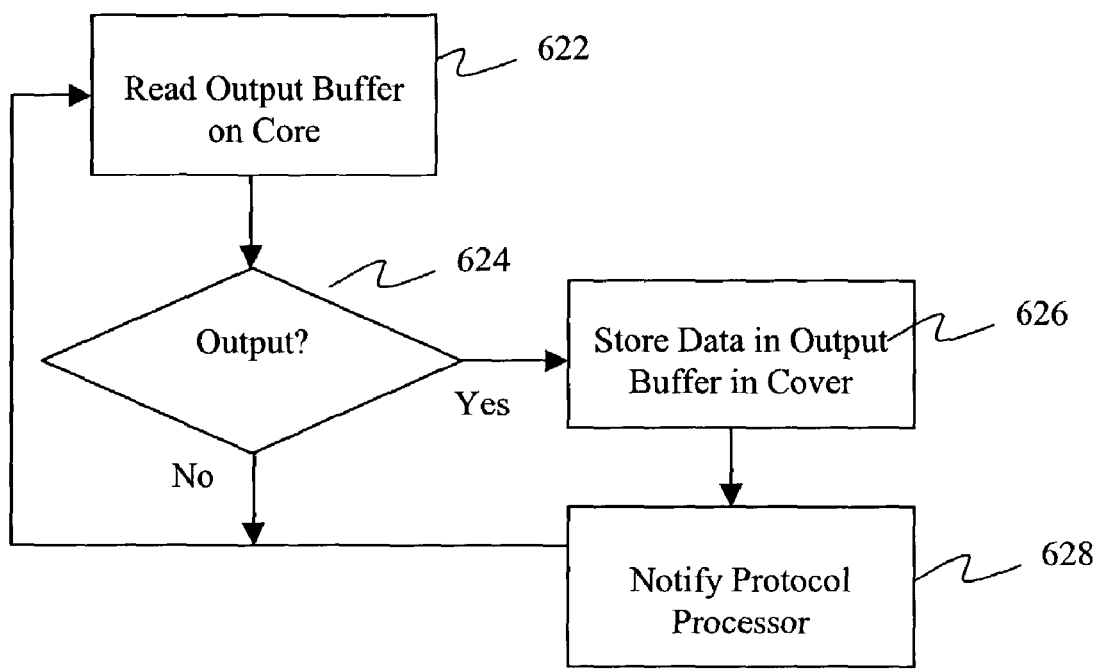

Similarly, as illustrated in FIG. 7b, upon invocation, device driver 532 of mobile device 300 attempts to read the storage locations of cover 100 allocated for storing data to be outputted to peripherals 102–104 (hereinafter, simply output buffer on mobile device 300), block 622. At block 624, device driver 532 determines if data were present and read. If no data were present and read, the process continues back at block 622.

However, if data were read, device driver 532 writes the data read out into storage locations of storage unit 404 of cover 100 (hereinafter, simply, output buffer of cover 100), block 626. If appropriate, device driver 532 further notifies protocol processor 403 to package the data for output to peripherals 102–104, block 628. Thereafter, the process continues back at block 622 again.

Accordingly, data may be advantageously inputted and/or outputted for mobile device 300 and peripherals 102–104.

ALTERNATE EMBODIMENTS

Figure 8:
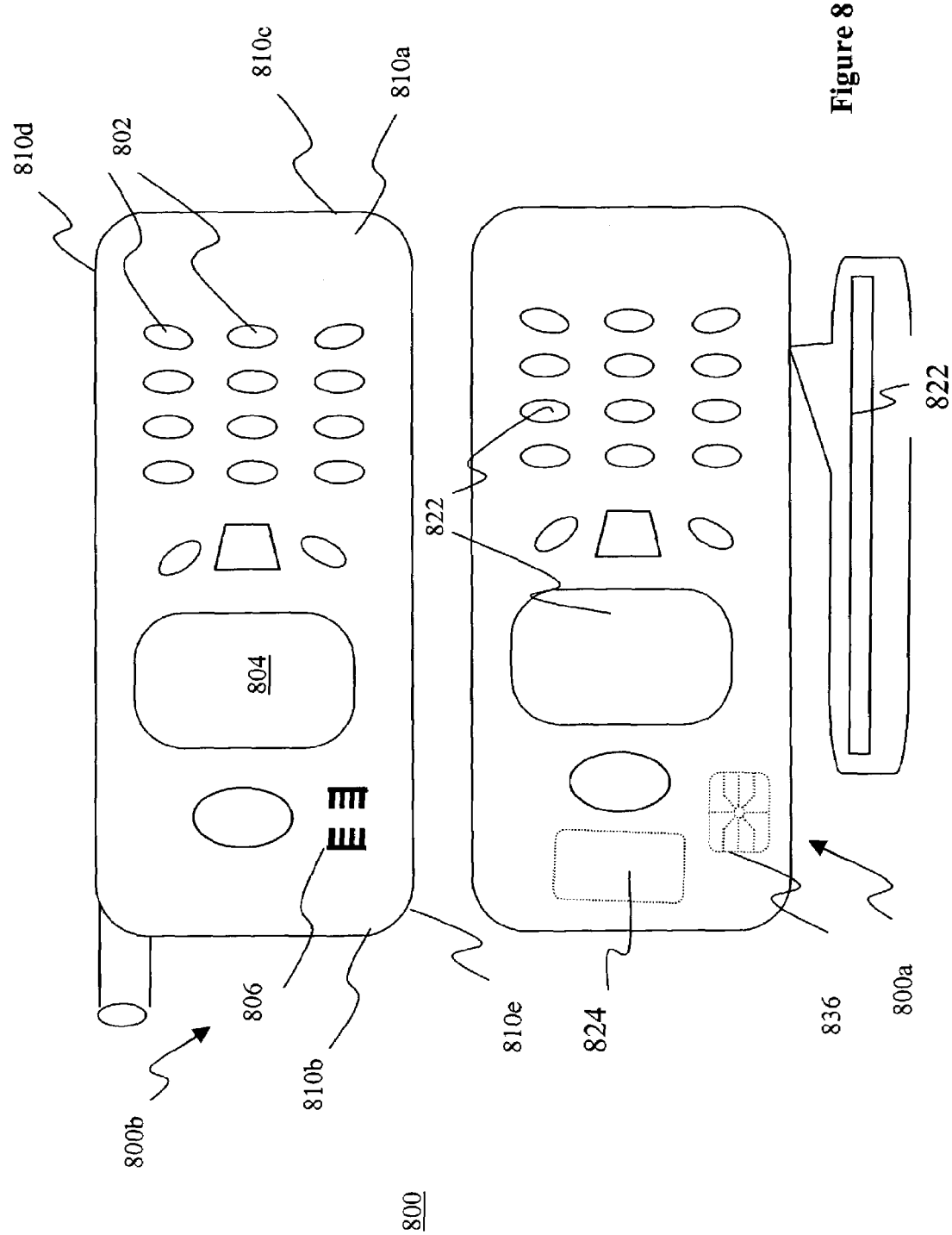
FIG. 8 illustrates an interchangeable cover incorporated with the teachings of the present invention, in accordance with an alternate embodiment.

FIG. 8 illustrates an alternate embodiment of the present invention. More specifically, FIG. 8 illustrates an exploded view of a mobile phone 800 having core unit 800b and cover 800a, endowed with the teachings of the present invention. Similar to mobile phone 300 of FIG. 4, core unit 800b of mobile phone 800 includes in particular, a number of input keys 802, display 804, expansion interface 806, and internal components similar to those of FIG. 6. As described earlier, the internal components are equipped with logic to enable additions of peripherals 822 and/or 824 to mobile phone 800. Further, core unit 800b includes a front and a number of side and end exteriors surfaces 810a–810e, disposed in different geometric planes.

Cover 800a is of a face plate type, having "cut outs" 822, to facilitate mating with core unit 800b. When mated, cover 800a covers at least front surface 810a and one of the side and end surfaces 810b–810e of core unit 800b. As the embodiment of FIG. 1, cover 800a includes one or more peripherals 822 and/or 824, and electronic component 836 having earlier described complementary logic, to add one or more peripherals 822 and/or 824 to mobile device 800.

Figure 9B:
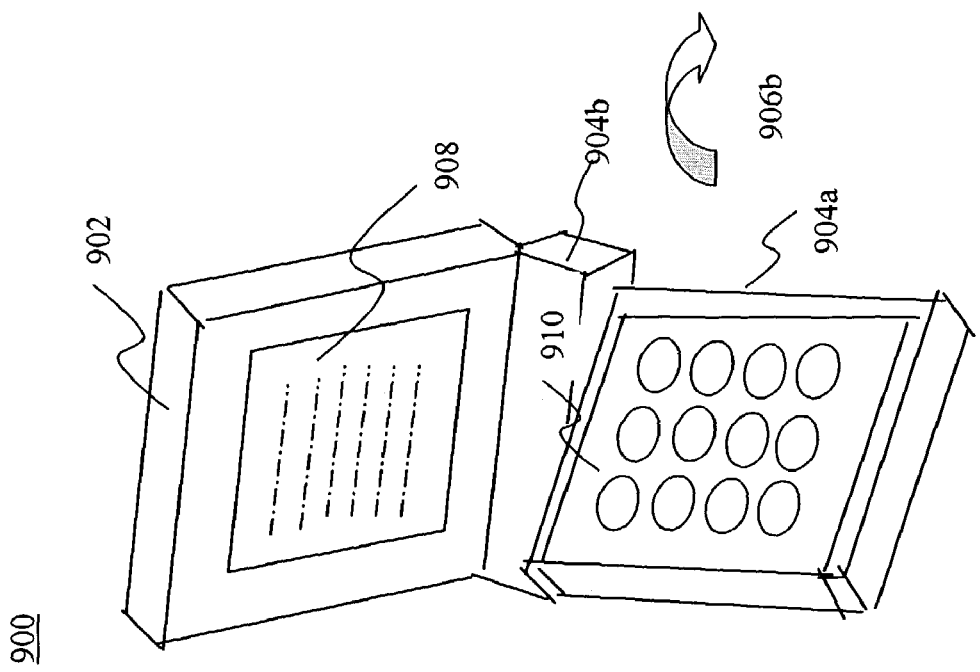
FIGS. 9a–9c illustrate an interchangeable over incorporated with the teachings of the present invention, in accordance with yet another embodiment.
Figure 9A:
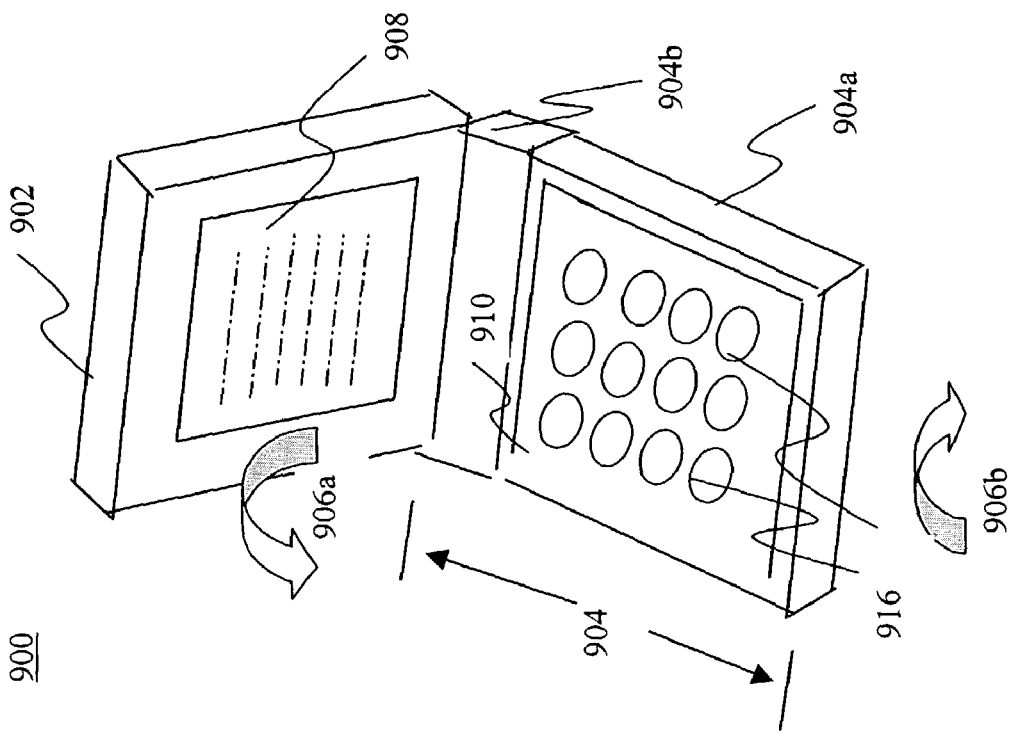
Figure 9C:
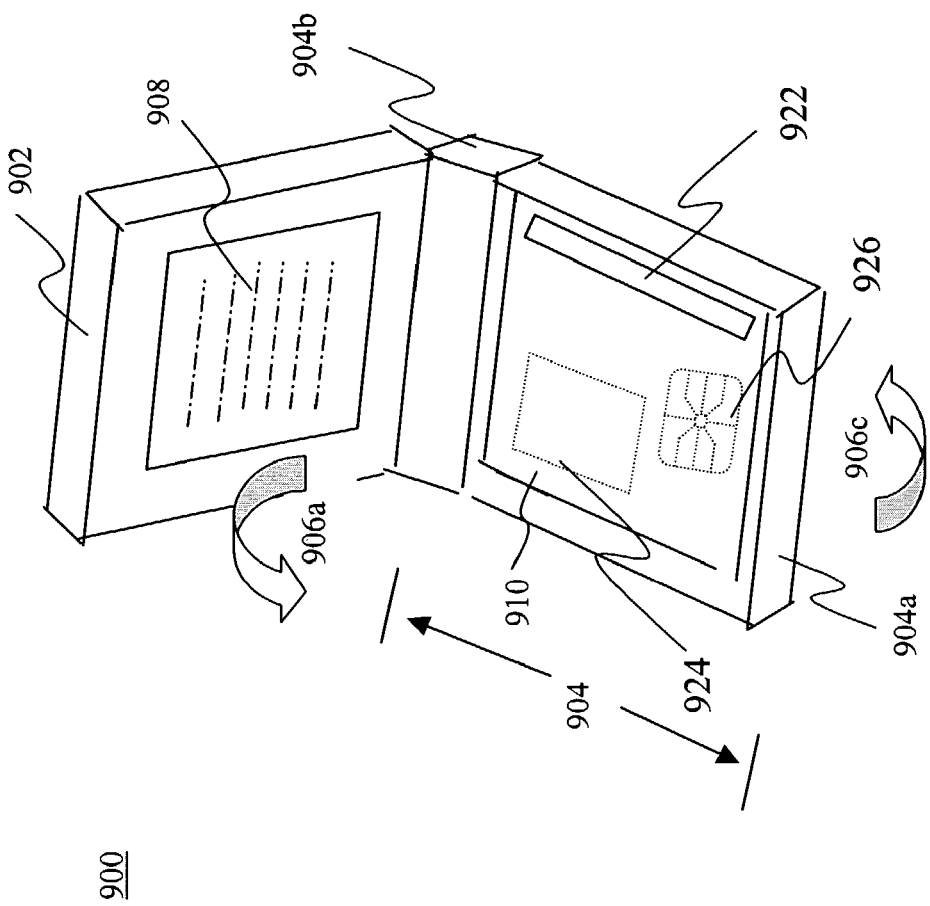

FIGS. 9a–9c illustrate yet another embodiment of the present invention. More specifically, FIG. 9a-9c illustrate three mated views of a mobile phone 900 having a core unit and cover 910, endowed with the teachings of the present invention. Unlike the earlier described embodiments, the core unit of mobile phone 900 has a multi-section form factor comprising a first section 902 and a second section 904, and the second section 904 is further comprised of at least two sub-sections 904a–904b. The first and second sections 902–904 may pivot towards each other as denoted by direction arrow 906a or away from each other opposite to the direction denoted by arrow 906a. Sub-section 904a may rotate relative to sub-section 904b as denoted by the directions denoted by arrows 906b–906c. In other words, mobile phone 900 may be considered as an improved version of what is commonly referred to as "flip" phones.

Similar to mobile phones 300 and 800 of FIGS. 4 and 8, the core unit of mobile phone 900 includes in particular, display 908, a number of input keys and expansion interface (covered by cover 910), and internal components similar to those of FIG. 6. As described earlier, the internal components are equipped with logic to enable additions of one or more peripherals 922 and/or 924 to mobile phone 900. Further, section 904 of mobile phone 900 with which cover 910 is to mate, includes a front and a number of side and end exteriors surfaces, disposed in different geometric planes.

Cover 910 is of a type similar to cover 100 of FIG. 1, i.e. U-shaped, except peripherals 922 and 924 to be added to mobile phone 900 and electronic component 926 are disposed on the inside and outside surfaces of the "back" surface respectively. As before, upon mating with section 904 of mobile phone 900, cover 910 covers at least partially a front surface and one of the side and end surfaces of section 904. For the embodiment, by rotating sub-section 904a relative to sub-section 904b of section 904, either input keys 916 or peripheral 922 may be made available for use in conjunction with display 908.

CONCLUSION AND EPILOGUE

Thus, it can be seen from the above descriptions, a novel method for adding peripherals to a mobile device, have been described.

While the present invention has been described in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. An interchangeable cover comprising:
   a cover body adapted to mate with a mobile device, and to serve as a cover of the mobile device, the mobile device having an extension interface;
   an input/output (I/O) interface disposed on the cover body, and adapted to engage with the extension interface of the mobile device;
   at least one peripheral device disposed on an exterior surface of the cover body; and
   an electronic component, disposed on an interior surface of the cover body, coupled to the peripheral device and the I/O interface, the electronic component being separate and distinct from the at least one peripheral device and configured to facilitate adding the at least one peripheral device to the mobile device mated with the cover body, through said I/O and extension interfaces, as peripheral device(s) of the mobile device.

2. The cover of claim 1, wherein the cover body is U-shaped and designed to be attached to the mobile device from a side of the mobile device.

3. The cover of claim 1, wherein the cover is a face plate, with the cover body designed to be attached to the mobile device from a front of the mobile device.

4. The cover of claim 1, wherein the at least one peripheral device comprises a non-volatile storage, and the electronic component is equipped to facilitate adding the non-volatile storage to the mobile device as an added non-volatile peripheral storage of the mobile device.

5. The cover of claim 1, wherein the at least one peripheral device comprises a volatile storage, and the electronic component is equipped to facilitate adding the volatile storage to the mobile device as an added volatile peripheral storage of the mobile device.

6. The cover of claim 1, wherein the at least one peripheral device comprises an application specific integrated circuit (ASIC), and the electronic component is equipped to facilitate adding the ASIC to the mobile device as an added peripheral ASIC of the mobile device.

7. The cover of claim 1, wherein the at least one peripheral device comprises a credit card reader, and the electronic component is equipped to facilitate adding the credit card reader to the mobile device as a peripheral credit card reader of the mobile device.

8. The cover of claim 1, wherein the at least one peripheral device comprises an optical scanner, and the electronic component is equipped to facilitate adding the optical scanner to the mobile device as a peripheral optical scanner of the mobile device.

9. The cover of claim 1, wherein at least one peripheral device is disposed on a front surface of the cover body.

10. The cover of claim 1, wherein at least one peripheral device is disposed on a side surface of the cover body.

11. The cover of claim 1, wherein at least one peripheral device is disposed on a back surface of the cover body.

12. The cover of claim 1, wherein the electronic component comprises a protocol processor.

13. The cover of claim 12, wherein the electronic component further comprises a storage unit.

14. The cover of claims 1, wherein the mobile device comprises functionalities of at least a selected one of a wireless mobile phone and a personal digital assistant.

15. A mobile device comprising
   a core unit including at least one extension interface; and
   an interchangeable cover removably attached to the core unit to serve as a cover of the core unit, the interchangeable cover having at least one peripheral device, an input/output (I/O) interface, and an electronic component, coupled to each other, with the at least one peripheral device disposed on an exterior surface of the cover and the electronic component disposed on an interior surface of the cover, the at least one peripheral device and the electronic component being separate and distinct from each other, and the I/O interface adapted to mate with the extension interface of the core unit to facilitate exchange of data between the core unit and the interchangeable cover, and at least one aspect of the electronic component designed to add the at least one peripheral device to the core unit, as peripheral device(s) of the core unit.

16. The mobile device of claim 15, wherein the interchangeable cover comprises a cover body that is U-shaped and designed to be attached to the mobile device from a side of the mobile device.

17. The mobile device of claim 15, wherein the interchangeable cover is a face plate designed to be attached to the mobile device from a front of the mobile device.

18. The mobile device of claim 15, wherein the at least one peripheral device of the interchangeable cover comprises a non-volatile storage, and the at least one aspect of the electronic component is designed to add the non-volatile storage to the core unit, as a peripheral device of the core unit.

19. The mobile device of claim 15, wherein the at least one peripheral device of the interchangeable cover comprises a volatile storage, and the at least one aspect of the electronic component is designed to add the volatile storage to the core unit, as a peripheral device of the core unit.

20. The mobile device of claim 15, wherein the at least one peripheral device of the interchangeable cover comprises an application specific integrated circuit (ASIC), and the at least one aspect of the electronic component is designed to add the ASIC to the core unit, as an add-on ASIC of the core unit.

21. The mobile device of claim 15, wherein the at least one peripheral device of the interchangeable cover comprises a credit card reader, and the at least one aspect of the electronic component is designed to add the credit card reader to the core unit, as a peripheral device of the core unit.

22. The mobile device of claim 15, wherein the at least one peripheral device of the interchangeable cover comprises an optical scanner, and the at least one aspect of the electronic component is designed to add the optical scanner to the core unit, as a peripheral device of the core unit.

23. The mobile device of claim 15, wherein the electronic components of the interchangeable cover comprise, a protocol processor.

24. The mobile device of claim 23, wherein the electronic component of the interchangeable cover comprises a storage unit.

25. The mobile device of claims 15, wherein the mobile device comprises functionalities of at least a selected one of a wireless mobile phone and a personal digital assistant.

26. The mobile device of claim 15, wherein the core unit comprises a first and a second section with the second section having a first and a second sub-section where the second-sub-section is rotatable relative to the first sub-section, and the cover removably attaches to the second sub-section of the second section.

27. A wireless mobile phone comprising:
 a core wireless telephony unit including a first and a second section with the second section having a first and a second sub-section where the second-sub-section is rotatable relative to the first sub-section; and
 a cover including at least one peripheral device, removably mated with the second sub-section.

28. The wireless mobile phone of claim 27 wherein said at least one peripheral device comprises a selected one of a non-volatile storage, a volatile storage, and an ASIC.

29. The wireless mobile phone of claim 27 wherein said at least one peripheral device comprises a selected one of a credit card reader and an optical scanner.

30. The wireless mobile phone of claim 27, wherein the first and the second sections are pivotally coupled to each other.

* * * * *

UNITED STATES PATENT AND TRADEMARK OFFICE
CERTIFICATE OF CORRECTION

PATENT NO. : 7,079,864 B2  
APPLICATION NO. : 10/301432  
DATED : July 18, 2006  
INVENTOR(S) : G. Eric Engstrom and Peter Zatloukal It is certified that error appears in the above-identified patent and that said Letters Patent is hereby corrected as shown below:

Title Page;  
(57) Abstract  
"...one or more peripherals complementary electronics..." should read --...one or more peripheral complementary electronics...--.

Column 2  
Line 3, "...interchangeable over..." should read --...interchangeable cover...--.  
Line 48, "...part that inherently include..." should read --...part that inherently includes...--.

Column 7  
Line 4, "...a novel method for adding peripherals to a mobile device, have been described" should read --...a novel method for adding peripherals to a mobile device has been described--.

Column 8  
Line 7, "...of claims 1,..." should read --...of claim 1,...--.  
Line 63, "...electronic components of..." should read --...electronic component of...--.  
Line 63, "...cover comprise a..." should read --... cover comprises a...--.

Column 9  
Line 1, "...of claims 15..." should read --...of claim 15...--.

Signed and Sealed this

Twenty-second Day of May, 2007

JON W. DUDAS  
*Director of the United States Patent and Trademark Office*